US007599894B2

(12) United States Patent
Owechko et al.

(10) Patent No.: US 7,599,894 B2
(45) Date of Patent: Oct. 6, 2009

(54) OBJECT RECOGNITION USING A COGNITIVE SWARM VISION FRAMEWORK WITH ATTENTION MECHANISMS

(75) Inventors: Yuri Owechko, Newbury Park, CA (US); Swarup Medasani, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 233 days.

(21) Appl. No.: 11/367,755

(22) Filed: Mar. 4, 2006

(65) Prior Publication Data

US 2007/0019865 A1    Jan. 25, 2007

Related U.S. Application Data

(60) Provisional application No. 60/658,942, filed on Mar. 4, 2005.

(51) Int. Cl.
*G06F 15/18* (2006.01)
*G06K 9/00* (2006.01)
*G06K 9/62* (2006.01)

(52) U.S. Cl. .................. 706/14; 382/104; 382/113; 382/224

(58) Field of Classification Search .............. 706/14; 382/104, 113, 224
See application file for complete search history.

(56) References Cited

U.S. PATENT DOCUMENTS 5,911,035 A * 6/1999 Tsao ..................... 706/16

2003/0142851 A1 * 7/2003 Brueckner et al. ......... 382/107

OTHER PUBLICATIONS

Eberhart, Russel. Shi, Yuhui. "Particle Swarm Optimization: Developments, Applications, and Resources" IEEE, 2001, p. 81-86.*
Bhanu, Blr. Lee, Sungkee. Ming, John. "Adaptive Image Segmentation Using a Genetic Algorithm." IEEE Transactions on Systems, Man, and Cybernetics, vol. 25, No. 12, Dec. 1995. p. 1543-1567.*
Doctor, Sheetal; Venayagamoorthy, Ganesh; Gudise, Venu; "Optimal PSO for Collective Robotic Search Applications". IEEE 2004, p. 1390-1395.*
Eberhart, Russel; Shi, Yuhui; "Guest Editorial Special Issue on Particle Swarm Optimization" IEEE Transactions on Evolutionary COmputation, vol. 8, No. 3 Jun. 2004. p. 201-203.*
D.L. Swets, et al., "Genetic Algorithms for Object Recognition in a complex scene," Proc. Of Intl. Conference on Image Processing, vol. 2, Oct., pp. 23-26, 1995.

(Continued)

*Primary Examiner*—David R Vincent
*Assistant Examiner*—Ben M Rifkin
(74) *Attorney, Agent, or Firm*—Tope-McKay & Assoc.

(57) ABSTRACT

An object recognition system is described that incorporates swarming classifiers with attention mechanisms. The object recognition system includes a cognitive map having a one-to-one relationship with an input image domain. The cognitive map records information that software agents utilize to focus a cooperative swarm's attention on regions likely to contain objects of interest. Multiple agents operate as a cooperative swarm to classify an object in the domain. Each agent is a classifier and is assigned a velocity vector to explore a solution space for object solutions. Each agent records its coordinates in multi-dimensional space that are an observed best solution that the agent has identified, and a global best solution that is used to store the best location among all agents. Each velocity vector thereafter changes to allow the swarm to concentrate on the vicinity of the object and classify the object when a classification level exceeds a preset threshold.

30 Claims, 8 Drawing Sheets

OTHER PUBLICATIONS

V. Ciesielski, et al., "Using genetic algorithms to Improve the accuracy of object detection." In Proceedings of the third Pacific-Asia Knowledge Discovery and Data Mining Conference. Ning Zhong and Lizhu Zhou (Eds.), Knowledge Discovery and Data Mining—Research and Practical Experiences. Tsinghua University Press, pp. 19-24, Beijing, China, Apr. 26-31, 1999.

Kennedy, J., et al., "Swarm intelligence," San Francisco: Morgan Kaufmann Publishers, 2001.

R.C. Eberhart, et al., "Particle swarm optimization: Developments, applications, and resources," 2001.

R. Brits, et al., "A Niching Particle Swarm Optimizer," 2002.

Office action from U.S. Appl. No. 10/918,336; our ref. No. HRL155.

B. Bhanu, et al., "Adaptive Image Segmentation Using a Genetic Algorithm," IEEE Transactions on Systems, Man, and Cybernetics, vol. 25, No. 12, Dec. 1995.

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical models for driver behavior recognition in a smart car," Proc. Of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Vide-based event recognition: activity representation and probabilistic recognition methods," CVIU 96(2004), 129-162.

G. Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

Y. Owechko, S. Medasani, and N. Srinivasa, "Classifier Swarms for Human Detection in infrared imagery," Proc. Of the CVPR workshop on Object Tracking and Classification Beyond the Visible Spectrum (OTCBVS'04) 2004.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

J.C. Bezdek, Pattern Recognition with Fuzzy Objective Function Algorithms, Plenum Press, New York, 1981.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling Human Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

F. Rojas, I. Rojas, R. M. Clemente, and C.G. Puntoner, "Nonlinear blind source separation using genetic algorithms," in Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Y. Owechko, et al., "Vision-Based occupant sensing and recognition for intelligent airbag systems," submitted to IEEE Trans. On Intelligent Transportation Systems, 2003.

Y. Owechko and S. Medasani, "A Swarm-based Volition/Attention Framework for Object Recognition," IEEE Conference on Computer Vision and Pattern Recognition, San Diego, Proc. Of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. On Evol. Computation on Particle Swarm Optimization, Vol. 8, No. 3, Jun. 2004.

K.E. Parsopoulos, et al. "On the Computation of All Global Minimizers Through Particle Swarm Optimization," Special issue of IEEE Trans. On Evol. Computation on Particle Swarm Optimization, vol. 8, No. 3, Jun. 2004.

F. van der Bergh, et al., "A Cooperative Approach to Particle Swarm Optimization," Special issue of IEEE Trans. On Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. On Evol. Computation on Particle Swarm Optimization, vol. 8, No. 3, Jun. 2004.

C.A. Coello, "Handling Multiple Objectives With Particle Swarm Optimization," Special issue of IEEE Trans. On Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. On Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. On Evol. Computation on Particle Swarm Optimization, vol. 8, No. 3, Jun. 2004.

R. Hassan, B. Cohanim, and 0. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. And S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. And Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. And J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

* cited by examiner

OBJECT RECOGNITION USING A COGNITIVE SWARM VISION FRAMEWORK WITH ATTENTION MECHANISMS

PRIORITY CLAIM

This patent application is Continuation-in-Part application, claiming the benefit of priority to U.S. Provisional Application No. 60/658,942, filed Mar. 4, 2005, entitled, "Object Recognition Using a Cognitive Swarm Vision Framework with Attention Mechanism," and also claiming the benefit of prior to U.S. Non-Provisional patent application Ser. No. 10/918,336, filed on Aug. 14, 2004, entitled, "Object Recognition Using Swarming Image Classifiers."

FIELD OF INVENTION

The present invention relates to an object recognition system and, more particularly, to an object recognition system that uses swarming image classifiers with cognitive swarms for visual recognition of an object in an image.

BACKGROUND OF INVENTION

Typically, classification of objects in an image is performed using features extracted from an analysis window which is scanned across the image. This sequential scanning search can be very computationally intensive, especially if a small window is used since a classification must be performed at each window position. Conventional approaches to reducing the computational load are based on reducing the search space by using another sensor such as radar to cue the vision system and measure the range of the object. Limitations of the radar approach include high cost, false alarms, the need to associate radar tracks with visual objects, and overall system complexity. Alternatively, previous vision-only approaches have utilized motion-based segmentation using background estimation methods to reduce the search space by generating areas of interest (AOI) around moving objects and/or using stereo vision to estimate range in order to reduce searching in scale. These methods add cost and complexity by requiring additional cameras and computations. Motion-based segmentation is also problematic under challenging lighting conditions or if background motion exists, as is the case for moving host platforms.

Motion-based systems form models of the static background in order to detect moving objects as "blobs" or silhouettes that do not match the background model. The performance will degrade, however, if the background contains high motion elements or if the camera is paning, zooming, or moving on a vehicle or aircraft or being carried by the user. Motion-based video analysis systems are also "brittle" in that the user must define rules for classifying the motion blobs that are specialized for each installation. These systems do not work well "out of the box" and require substantial setup and customization for each installation.

Additionally, there have been attempts to use genetic and evolutionary algorithms for object detection. Genetic algorithms (GAs) have been used before for decreasing the search space in vision systems. The GA systems employ a population of individual solutions that use crossover and mutation to maximize the fitness function. Other efforts have used GAs for training and adapting neural networks to recognize objects. The chromosome representation of solutions and cross-over operation in GA often result in large changes in the solution occurring as a result of small changes in the representation. This results in a "noisy" evolution of solutions and longer time to convergence.

Simulated annealing has also been used for optimization problems with discontinuous solution spaces with many local optima. However, the annealing schedule results in many more classifier evaluations than is necessary for cognitive swarms, making it impractical for real-time applications in computer vision.

Thus, a continuing need exists for an effective and efficient object recognition system for classifying objects in an image.

SUMMARY OF INVENTION

The present invention relates to an object recognition system, and more particularly, to an object recognition system that incorporates swarming domain (e.g., image) classifiers for visual recognition of an object in an image. The system comprises at least one cognitive map having a one-to-one relationship with an input image domain. The cognitive map is capable of recording information that software agents utilize to focus a cooperative swarm's attention on regions in the domain most likely to contain objects of interest. A plurality of software agents are included that operate as a cooperative swarm to classify an object in the domain. Each agent is a complete classifier and is assigned an initial velocity vector to explore a solution space for object solutions. Additionally, each agent is configured to perform at least one iteration as influenced by the recorded information of the cognitive map. The iteration is a search in the solution space for a potential solution optima where each agent keeps track of its coordinates in multi-dimensional space that are associated with an observed best solution (pbest) that the agent has identified, and a global best solution (gbest). The gbest is used to store the best location among all agents with each velocity vector thereafter changing towards pbest and gbest, thereby allowing the cooperative swarm to concentrate on the vicinity of the object and classify the object when a classification level exceeds a preset threshold.

Additionally, the cognitive map is a map selected from a group consisting of a ground surface map, an interest map, an object map, and a saliency map.

The ground surface map is configured to store expected object height in pixels at each image location. The ground surface map also constrains an analysis window to an appropriate size at each domain location. Additionally, the ground surface map implements space-variant initialization of the cooperative swarm.

In another aspect, using the ground surface map, the system calculates a vertical coordinate of y of an imaged object using a pinhole imaging model. The vertical coordinate of y is calculated according to the following:

$$y = -f\tan\alpha - \frac{f(z-z_c)(\tan^2\alpha + 1)}{Y - (z-z_c)\tan\alpha},$$

where z is the height of the object, $z_c$ is the camera height, Y is the distance of the object from the camera, $\alpha$ is the camera tilt angle, and $f$ is the camera focal length.

In yet another aspect, the interest map is configured to store swarm attracting/repelling pheromones at each domain location. Attracting pheromones have positive values and are stored to attract swarms to high saliency regions and to regions more likely to contain objects based on previous detection results or external inputs. Repelling pheromones have negative values and are stored to repel swarms away from regions that do not contain objects or which have already been explored, thereby preventing clustering of agents on low confidence regions.

In operation, the interest map is configured to run and maintain a sorted list for gbest and pbest, along with the associated $F_A$ values. $F_A$ is an objective function and is calculated according to the following:

$$F_A = \mu(Q_+ - Q_-) + (1-\mu)F_C,$$

where $Q_+$ denotes an attracting pheromone and $Q_-$ denotes a repelling pheromone, and where $\mu$ is a nonnegative weighting factor, and $F_C$ is an object classifier confidence value. Additionally, the interest map is updated at each iteration of the swarm and $F_A$ is updated for each entry in the sorted list, whereby the swarm is modified by the interest map in such a way as to focus attention on regions of increased saliency.

In yet another aspect, using the object map, the system is configured to perform multiple operations. For example, the system stores information at each domain location on previously detected objects. Additionally, the system prevents unnecessary classifier evaluations and initializes swarms only in regions where objects have not yet been detected. Furthermore, the system initializes swarms in regions more likely to contain objects based on previous detection results. The system is also configured to recognize object groups and behaviors.

In yet another aspect, system is further configured to track an object in multiple input images. In doing so, the system receives a first current input image. A global swarm is then initialized to search for objects within the input image. Local swarms are assigned to objects identified by the global swarm. A next input image is received, where the next input image is deemed the current input image and a previous current input image is deemed the previous input image. The local swarms are then initialized to search for and identify objects in the current input image. Local swarms are then deleted that lost their identified objects between the current and previous input images. Next, the global swarm is initialized to search for new objects in the current input image. Local swarms then assigned to new objects identified in the current input image. The above operations are then repeated for subsequent next images.

Finally, as can be appreciated by one in the art, the present invention also includes a method and computer program product. The method comprises acts of the operations described herein. Additionally, the computer program product comprises instruction means stored on a computer-readable medium for causing a computer to carry out the operations of the present invention.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
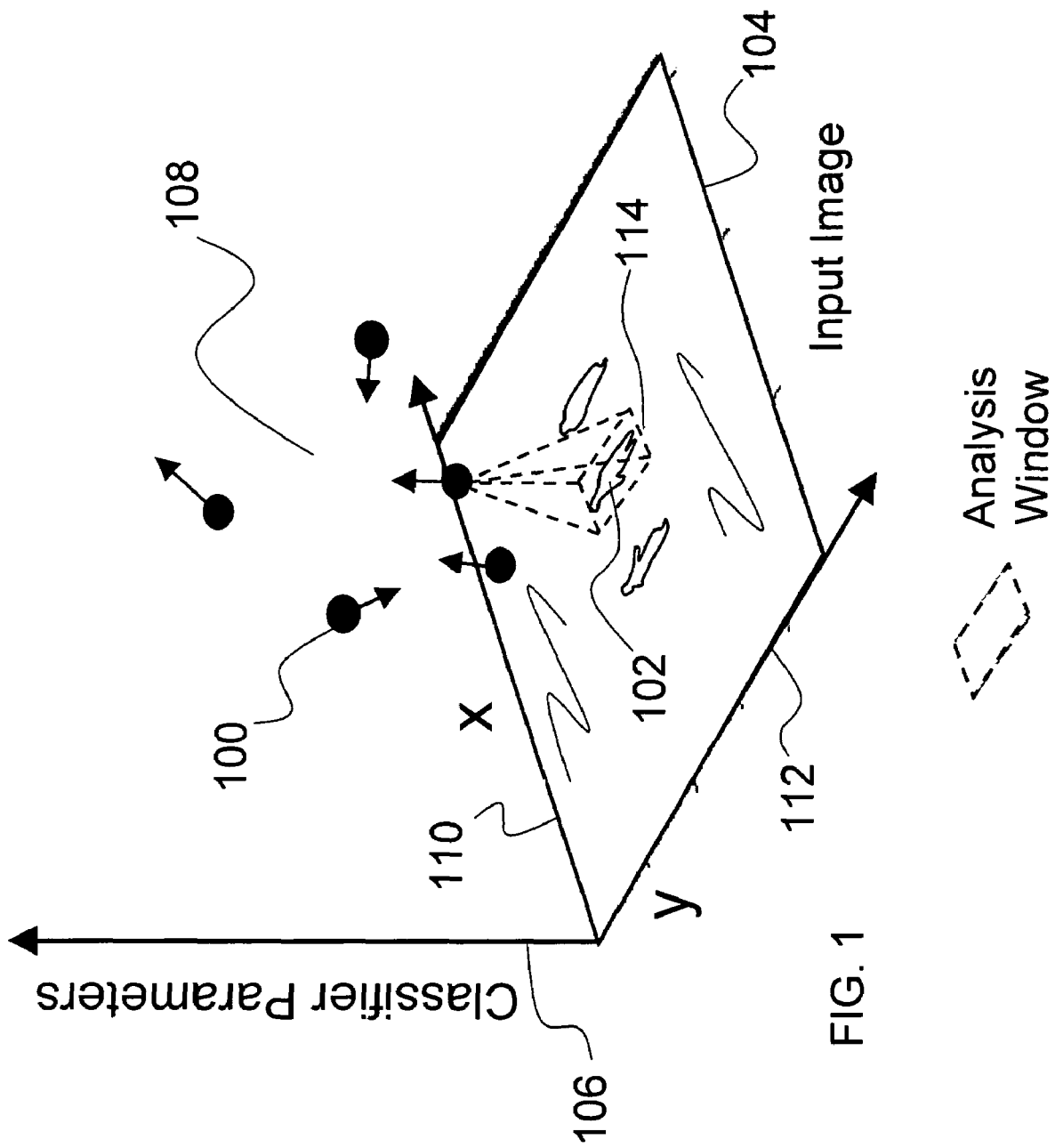
FIG. 1 is an illustration of exemplary object recognition using a cognitive swarm of classifier agents or particles.

The present invention relates to an object recognition system and, more particularly, to an object recognition system that uses swarming image classifiers with cognitive swarms for visual recognition of an object in an image. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. Additionally, the process for object recognition using swarming image classifiers draws material from the process shown and described in U.S. patent application Ser. No. 10/918,336, of which the entire disclosure is hereby incorporated by this reference as though fully set forth herein. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is presented. Second, a description of various principal aspects of the present invention is provided. Third, an introduction is provided to provide the reader with a general understanding of the present invention. Fourth, a description of various aspects of the present invention is provided to give an understanding of the specific details.

(1) Glossary

Before describing the specific details of the present invention, a glossary is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Domain—The term "domain" refers to any searchable dimension in the solution space, non-limiting examples of which include spatial coordinates, scale, frequency, time, Doppler shift, time delay, wave length, and phase.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer readable medium such as a floppy disk, a CD-ROM, and a flash drive.

Large Core—The term "large core" refers to a relatively large volume in the solution space in which all points have classification confidence values above a given threshold. Objects tend to generate large cores.

PPSO—The term "PPSO" refers to a possibilistic particle swarm optimization algorithm that allows different groups of software agents (i.e., particles) to work together with different temporary search goals that change in different phases of the algorithm.

PSO—The term "PSO" refers to a particle swarm optimization (PSO) algorithm that searches a multi-dimensional solution space using a population of software agents (i.e., particles) in which each agent has its own velocity vector. The success of each agent in finding good solutions has an influence on the dynamics of other members of the swarm.

Sequential Niching—The term "sequential niching" refers to a method for searching a domain, where once the software agents identify and classify an object in the domain, the object is erased from the domain so that the swarm can continue searching the domain for additional objects without being distracted by the previously identified object.

Small Core—The term "small core" refers to a relatively small volume in the solution space in which all points have classification confidence values above a given threshold. Non-object false alarms tend to generate small cores.

Software Agent—The term "software agent" refers to a self-contained computer program that operates autonomously, although its behavior may be affected by the actions of other agents. The term "software agent" is also to be used interchangeable with the word "particle."

Window—The term "window" refers to an analysis window determined by each agent's location in the image spatial coordinates and scale coordinates. The analysis window is the image region processed by the agent to determine if an object is located there.

(2) Principal Aspects

The present invention has three "principal" aspects. The first is an object recognition system using swarming domain classifiers, typically in the form of software and/or manual operations, operated using a data processing system (e.g., computer). When in the form of software, it is typically in the form of software modules configured to perform the operations described herein. The second principal aspect is a method for object recognition, the method operating using a computer system. The third principal aspect is a computer program product. The computer program product generally represents computer readable code (either source or object code) stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

(3) Introduction

A previous application by the same applicant, U.S. patent application Ser. No. 10/918,336, entitled, "Object Recognition System Incorporating Swarming Domain Classifiers," describes a new method called "cognitive swarms." The cognitive swarms are used for visual recognition of objects in an image which combines feature-based object classification with efficient search mechanisms based on swarm intelligence. Cognitive swarms consist of groups of object classifier agents that both cooperate and compete to find objects such as pedestrians or vehicles in video data using particle swarm optimization (PSO). As described in the previous application, a single large swarm detects and recognizes objects in images very efficiently. The present invention expands on the cognitive swarm idea by adding an attention-based framework for incorporating image saliency, past experience, and constraints on possible object positions to help guide the swarm in locating objects. The framework also includes methods for further reducing false alarms by using spatial, size, and symmetry diversity.

The method of cognitive swarms described in the previous application is a much more efficient method for finding objects in an image compared to searching based on scanning the image or using gradient information, especially if the scale of the object is not known beforehand. Both theoretical analysis and experimental results show orders of magnitude speedup over scanning or gradient-based search. The number of false alarms per image is also greatly reduced, which is very important for practical applications. The attention-based framework described in the present invention further improves the performance of cognitive swarms by allowing the classifier agents to be guided by additional information such as image saliency, past experience of the swarm, and a priori constraints on possible object positions in the image. The framework of the present invention also provides a natural way to incorporate expectations based on previous recognition results or externally-supplied rules. For example, if a vehicle has been detected, a pedestrian cognitive swarm could be made to focus its attention near the vehicle to "catch" people exiting or entering.

The attention-based cognitive swarm framework is also well-suited to analyzing video imagery with large amounts of extraneous background motion which can cause false alarms for systems that use motion as the central defining feature for recognizing objects. Unlike motion-based commercial video analysis systems such as Active Video and Object Video, the cognitive swarm framework recognizes objects using appearance-based statistical models that do not require the user to define recognition rules for each situation. Motion-based systems form models of the static background in order to detect moving objects as "blobs" or silhouettes that do not match the background model. The performance will degrade, however, if the background contains high motion elements or if the camera is panning, zooming, or moving on a vehicle or aircraft or being carried by the user. Motion-based video analysis systems are also "brittle" in that the user must define rules for classifying the motion blobs that are specialized for each installation. These systems of the prior art do not work well "out of the box" and require substantial setup and customization for each installation. Compared with the present invention, the cognitive swarm framework, however, has much greater generality. The same object classifier can be used for a wide range of installations, situations, lighting conditions, and imaging wavelengths. For example, the same pedestrian classifier can be used for both visible and infrared imagery as well as both static and moving cameras with high motion backgrounds. This is made possible by the fact that the cognitive swarm framework does not use motion to classify objects, although motion can be used as an attention mechanism to cue the system.

Instead, recognition is based on the general appearance of objects, such as the distribution of edges and textures, which is closer to how the human visual system perceives objects. Appearance-based recognition is more powerful than motion-based recognition because motion silhouettes do not preserve the internal details of objects, and information about object shapes can be lost through the smearing distortions of motion segmentation. For example, it would be useful to recognize an individual carrying a high-power weapon which can be roughly modeled as a long tube. If the tube is rotated, an appearance-based model can be matched to the rotated tube by simply rotating the model. Motion does not remove information in an appearance-based framework.

A motion-based segmentation of the tube, on the other hand, will vary drastically depending on the orientation of the motion relative to the tube. The silhouette can be longer or thinner than the tube, or disappear entirely if it stays motionless long enough to become part of the background model. In addition, appearance-based recognition can be performed at longer ranges than motion-based recognition because more information is preserved, which allows classification with fewer pixels on target. Demonstrations utilizing the present invention have yielded reliable pedestrian recognition with pedestrian heights of fewer than twenty (20) pixels. Finally, motion-based recognition tends to group adjacent moving objects together as one silhouette, making it difficult to recognize multiple pedestrians in a crowd or perform recognition by parts such as first recognizing a pedestrian and then recognizing the high-power weapon he is carrying. Appearance-based recognition is much less prone to such merging of objects.

Accordingly, the present invention describes a new object recognition framework which consists of mechanisms for modulating the attention of appearance-based cognitive swarms using imaging geometry, saliency, and experience-based cues. Saliency can consist of various factors such as motion, texture, or other features. These cues are used to direct the attention of the cognitive swarm but they are not used in the classification of the object. This is a critical distinction because it allows the cognitive swarm to be both more accurate and much less prone to false alarms while still taking advantage of saliency cues to speed up the detection of objects.

The cognitive swarm framework differs from other vision algorithms in its use of swarm intelligence at the classifier level. Optimization is performed in a solution space consisting of object location, scale, and classifier parameter dimensions, as well as possibly other dimensions. The particles swarm in this space in order to find the local optima which correspond to objects in the image. The classifier details are not visible at the abstraction level of the swarm. The approach of the present invention is substantially different from previous work in that each particle from the population is a unique classifier. As the population swarms around the solution space, the classifiers adjust parameters to best detect the objects in the scene.

Currently, there are no existing object recognition methods that use particle swarms in which each particle is a complete object classifier. However, there have been attempts to use genetic and evolutionary algorithms for object detection. Genetic algorithms (GAs) have been used before for decreasing the search space in vision systems. These systems employ a population of individual solutions that use crossover and mutation to maximize the fitness function. Other efforts have used GAs for training and adapting neural networks to recognize objects.

The approach of the present invention is substantially different from the previous work in that each particle from the population is a unique classifier. As the swarm travels around the solution space, each classifier agent adjusts its velocity based on the best locations it and the swarm as a whole have found. This causes the swarm to condense on the region containing the best solution found thus far. This in turn increases the density of agents which increases the probability of finding a better solution.

Use of the present invention has shown that the localization volume decreases exponentially with time. An advantage of cognitive swarms over GA solutions is the natural and continuous mapping from the representation space to the solution space. The chromosome representation of solutions and cross-over operation in GA often result in large changes in the solution, which occurs as a result of small changes in the representation. This results in a "noisy" evolution of solutions and longer time to convergence. Due the cooperative nature of cognitive swarms, the cognitive swarm converges much more quickly on good regions of the solution space.

Simulated annealing has also been used for optimization problems with discontinuous solution spaces with many local optima. However, the annealing schedule results in many more classifier evaluations than is necessary for cognitive swarms, making it impractical for real-time applications in computer vision.

(4) Description

To provide the reader with a clear understanding of the present invention, first a summary is provided of the cognitive swarm method for object recognition that was described in the previous application, U.S. patent application Ser. No. 10/918,336. Next, the attention-based framework for cognitive swarms that is the subject of the present invention will be described in detail.

(4.1) Cognitive Swarm Method for Object Recognition

Cognitive swarms combine feature-based object classification with efficient search mechanisms based on particle swarm optimization. Objects in a visual scene need to be located and classified so they can be tracked effectively for automotive safety, surveillance, perimeter protection, and a variety of other government, and commercial applications. Typically, classification of objects in an image is performed using features extracted from an analysis window which is scanned across the image. This brute force search can be very computationally intensive, especially if a small window is used since a classification must be performed at each window position. Conventional approaches to reducing the computational load are based on reducing the search space by using another sensor such as scanning radar to cue the vision system and measure the range of the object. Limitations of the radar approach include high cost, false alarms, the need to associate radar tracks with visual objects, and overall system complexity.

Alternatively, previous vision-only approaches have utilized motion-based segmentation using background estimation methods to reduce the search space by generating areas of interest (AOI) around moving objects and/or using stereo vision to estimate range in order to reduce searching in scale. Two novel search mechanisms are described that can efficiently find multiple instances of multiple object classes in a scene without the need for ancillary sensors or brute force searching. This approach utilizes the particle swarm optimization (PSO) algorithm, a population based evolutionary algorithm, which is effective for optimization of a wide range of functions. The algorithm models the exploration of multi-dimensional solution space by a population of individuals where the success of each individual has an influence on the dynamics of other members of the swarm. One of the novel aspects of this approach is that two of the dimensions are used to locate objects in the image, while the rest of the dimensions are used to optimize the classifier and analysis window parameters.

PSO is a relatively simple optimization method that has its roots in artificial life in general, and to bird flocking and swarming theory in particular. Conceptually, it includes aspects of genetic algorithms and evolutionary programming. Each potential solution is assigned a randomized velocity vector and the potential solutions called particles then "fly" through the space in search of the function optima. (These particles should not be confused with particle filters, which estimate probability distributions for tracking and localization applications.) The particles are self-contained agents that classify local image patches as belonging to one of a set of classes. Each particle keeps track of its coordinates in a multi-dimensional space that are associated with the best solution (pbest) it has observed so far. A global best parameter (gbest) is used to store the best location among all particles. The velocity of each particle is then changed towards pbest and gbest in a probabilistic way according to the following update equations:

$$v^i(t) = wv^i(t-1) + c_1 * \text{rand}()*(p\text{best} - x^i(t-1)) + c_2 * \text{rand}()*(g\text{best} - x^i(t-1))$$

$$x^i(t) = x^i(t-1) + v^i(t),$$

where $x^i(t)$ and $v^i(t)$ are the position and velocity vectors at time t of the i-th particle and $c_1$ and $c_2$ are parameters that weight the influence of their respective terms in the velocity update equation. w is a decay constant which allows the swarm to converge to a solution more quickly. The rand( ) function generates a random number between 0 and 1 with a uniform distribution.

The above dynamics reflect a socio-psychological model where individual particles change their beliefs in accordance with a combination of their own experience and the best experience of the group (this is in contrast to other models of cognition where an individual changes his beliefs to become more consistent with his own experience). The random element introduces a source of noise which enables an initial random search of the solution space. The search then becomes more directed after a few iterations as the swarm starts to concentrate on more favorable regions.

This type of search is much more efficient than a brute force search or gradient based search methods. It is similar to genetic algorithms in that it can be used for discontinuous and noisy solution spaces since it only requires an evaluation of the function to be optimized at each particle position, with no gradient information being used. Unlike the chromosome string representation of potential solutions used in genetic algorithms, the PSO particles do not undergo cross-over or mutation operations, they just travel to a different position, calculate the solution at that position, and compare it with their own and global previous best positions in order to update their velocity vectors. The evolution of good solutions is stable in PSO because of the way solutions are represented, e.g. small changes in the representation result in small changes in the solution, which results in improved convergence properties compared to GAs. PSO relies on the fact that in most practical problems the optimum solution usually has better than average solutions (i.e., good solution) residing in a volume around it. These good solutions tend to attract the particles to the region where the optimum lies. The swarm becomes more and more concentrated until the optimum is found (e.g., gbest no longer changes). PSO has been applied to a wide variety of optimization problems. It has been found experimentally that the number of particles and iterations required scale weakly with the dimensionality of the solution space. The total number of function evaluations is very small compared to the size of the solution space, as was shown in the previous patent application. Basic PSO searches only for a single optimum in the solution space, but various approaches have been described for finding multiple local optima or "niches."

The basic cognitive swarm concept described in the previous application is shown in FIG. 1. As shown in FIG. 1, a swarm of classifier agents 100 (i.e., particle swarm optimization (PSO) particle), each of which is a self-contained image classifier, searches for objects 102 in a combined image 104/classifier 106 parameter solution space 108. Additionally, each agent 100 both competes and cooperates with other agents 100 using simple dynamics to find objects 102 in the scene by optimizing the classifier outputs. Furthermore, analysis and experimental results show that cognitive swarms can both improve the detection/false alarm operating point and improve update rates by orders of magnitude over conventional search methods. It should be noted that the words agent and particle are used interchangeably herein.

The objective is to find multiple instances of an object class in an input image 104. The PSO particles 100 move in a solution space 108 where two of the dimensions represent the x 110 and y 112 coordinates in the input image 104. The key concept in this approach is that each particle 100 in the PSO swarm is a self-contained object classifier which outputs a value representing the classification confidence that the image distribution in the analysis window 114 associated with that particle 100 is or is not a member of the object class. All particles implement the same classifier, only the classifier parameters vary as the particle 100 visits different positions in the solution space 108. Two of the solution space dimensions represent the location of the analysis window 114 on the input image 104. A third dimension represents the size or scale of the analysis window 114 in order to match the unknown size of objects in the image 104. Additional dimensions can be used to represent other classifier parameters such as, for example, the rotation angle of the object or the wavelength band of the image.

The method described herein differs from other vision algorithms which use swarm intelligence in that the other methods use swarms to build up features using ant colony pheromone-based ideas. In the method of the present invention, swarming is done at the classifier level in a space consisting of object location, scale, and other classifier parameter dimensions, where each particle is a complete classifier. The particles swarm in this space in order to find the local optima which correspond to objects in the image. The classifier details are not visible at the abstraction level of the swarm.

One can imagine a multidimensional surface of classifier confidence (a type of saliency map) that can be generated if the classifier is scanned across all of the dimensions. The classifier confidence map for an image can be discontinuous and noisy, with many isolated false alarms where the classifier responds incorrectly to patterns in the image. Thus, using gradient-based methods to find objects in an image is problematic, which is why an exhaustive search is usually used. By generating classifier confidence maps for many images, it has been found experimentally that objects in the scene tend to have large "cores" of high confidence values. Many false alarms tend to be isolated with small cores. Since the probability of a particle landing in or near a core is greater for a larger core, the particles are attracted more to larger cores and the number of false alarms in a image are reduced using PSO compared to exhaustive searching. In an exhaustive search, all of the false alarms in an image will be detected so the classifier must be biased towards very low false alarm rates in order to keep the overall false alarm rate low, which also has the side effect of reducing the detection rate.

In summation, the previous application described how a single large cognitive swarm can be used to recognize multiple objects in the scene through "sequential erasing" in which a detected object is erased with a gaussian distribution before reinitializing the swarm to search for additional objects. The previous application also described a "possibilistic" clustering approach for detecting multiple objects.

Figure 2:
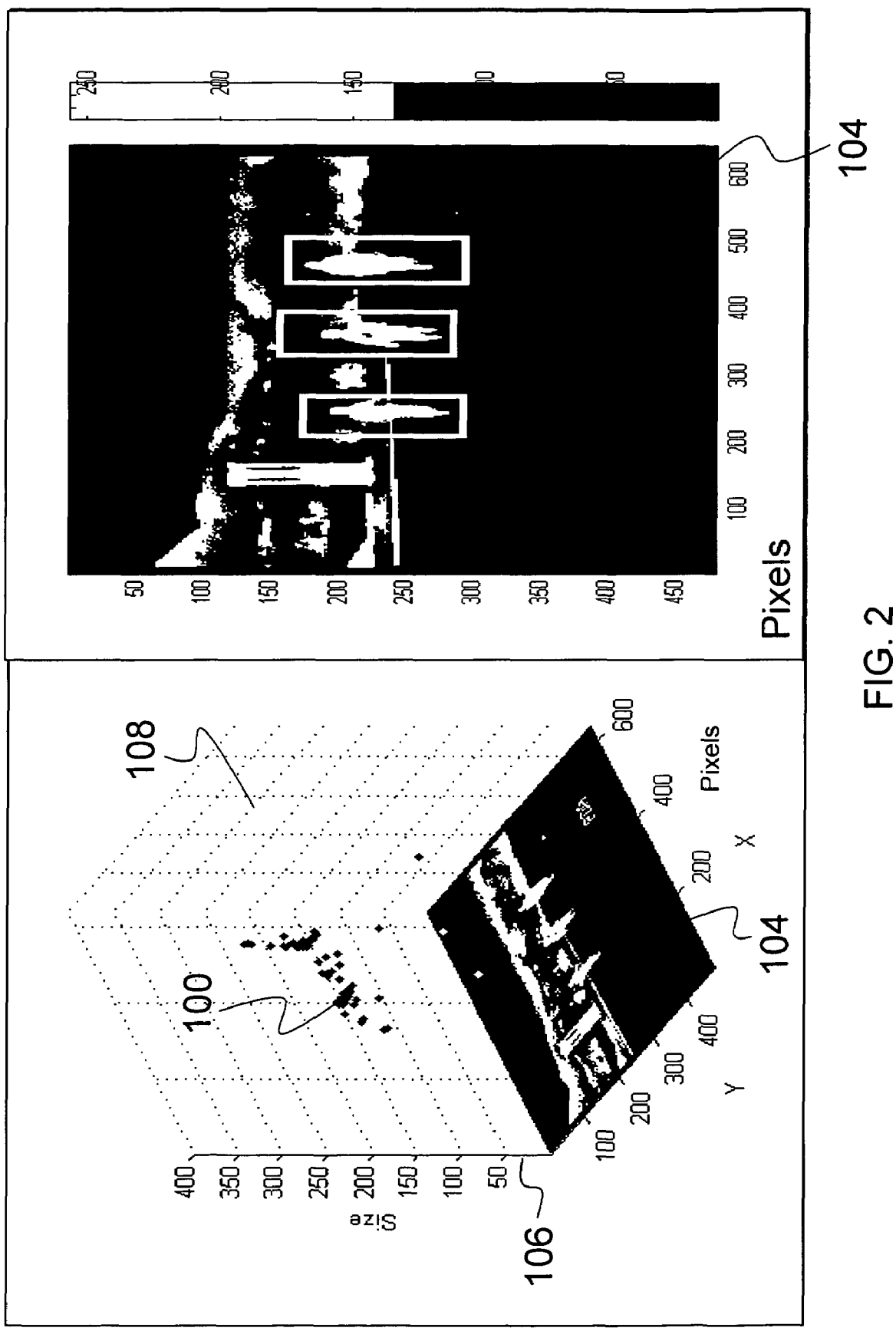
FIG. 2 is an illustration of exemplary multiple object recognition by a cognitive swarm consisting of human classifier agents using local image erasure.

For illustrative purposes, exemplary results of detecting multiple objects using sequential erasure are shown in FIG. 2. As shown, the agents 100 are searching for actual objects in a combined image 104/classifier 106 parameter solution space 108.

(4.2) Attention-Based Framework for Cognitive Swarms

Figure 3:
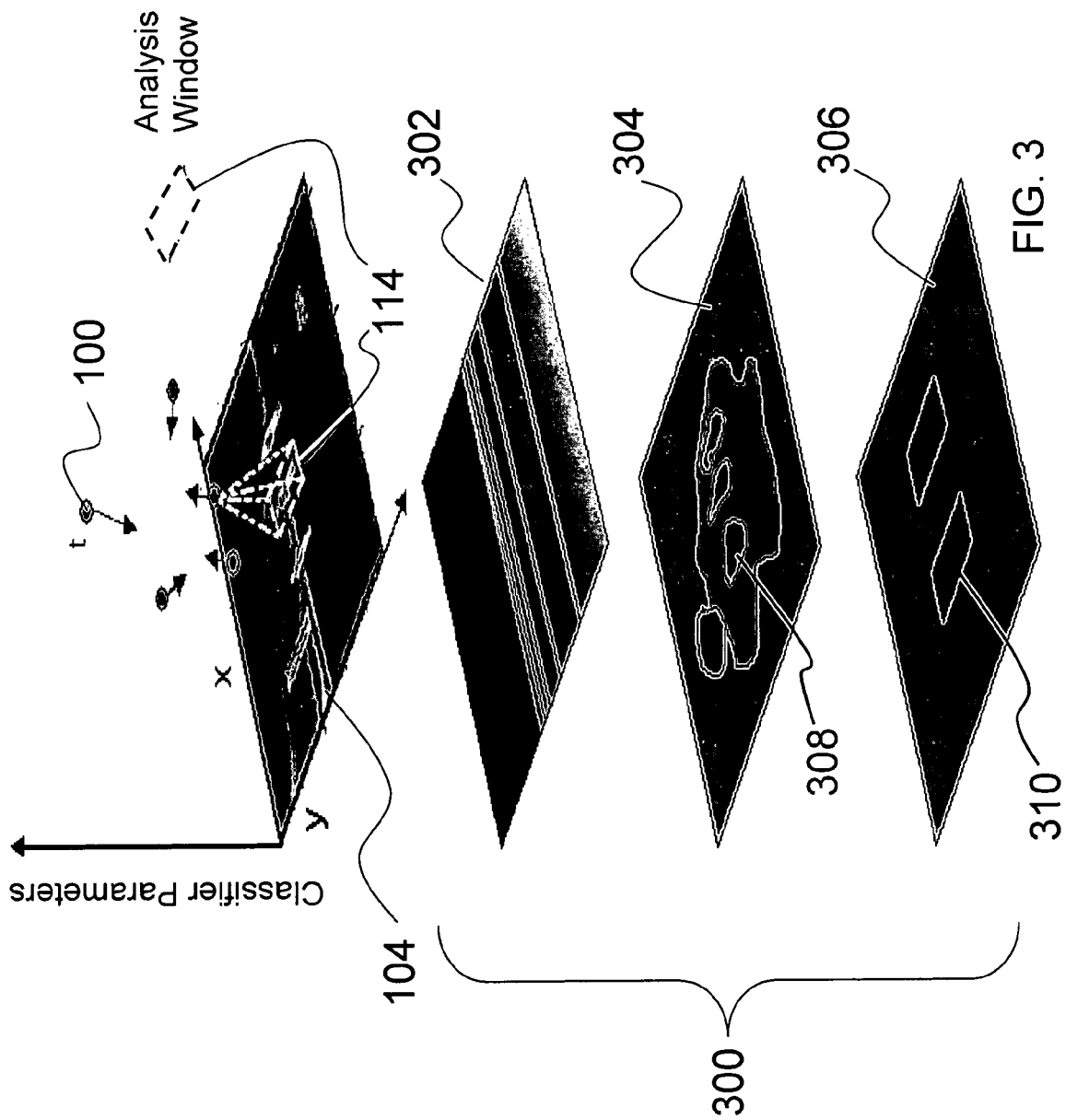
FIG. 3 is an illustration of an overview of an attention-based cognitive swarm framework according to the present invention.

The present invention describes a new attention-based framework for cognitive swarm detection and recognition of objects. The framework consists of a set of "cognitive maps" that are added to the basic cognitive swarm object recognition framework described above. As shown in FIG. 3, the maps 300 have the same dimensions as the input image 104 and are in one-to-one registration with it. The maps 300 are used to record additional information that the classifier agents 100 or particles can use to improve performance and implement new capabilities. As non-limiting examples, the additional information can come from user inputs, models of the environment, image saliency cues, externally-driven expectation, or experience of other swarms. By serving as intermediaries for communication between an agent and another agent, swarm, or external input, the maps 300 improve performance by helping to focus the swarm's attention on the regions most likely to contain objects of interest. Four non-limiting examples of cognitive maps include a Ground Surface (plane) Map 302, an Interest Map 304, an Object Map 306, and a Saliency Map (the general framework is not necessarily limited to these four). FIG. 3 illustrates the logical relationship between the input image 104, cognitive maps 300, and the classifier swarm (individual agents depicted as element 100) which together form the attention framework. For further illustration, each cognitive map and various aspects of the present invention are described in further detail below.

(4.2.1) Ground Surface Map

The ground surface map 302 is used for reducing the search space of the classifier swarm when information on the location of the ground in the image 104 is available and the objects of interest can be assumed to be tied to the ground. The ground surface map is used to constrain an analysis window 114 to an appropriate size at each image location, and to implement space-variant initialization of the swarm.

The ground surface map 302 specifies the expected height of the object in pixels at every location in the image 104. This eliminates the need for searching along the dimension of object scale and reduces the number of classifier evaluations necessary for convergence. In addition, by distributing the particles 100 in inverse proportion to the expected object size at each location, more particles 100 can be initialized near the horizon where the expected object size is smaller and objects are harder to detect.

If the ground surface is a plane and a pinhole imaging model is used, a model for vertical coordinate y of an imaged object is given by:

$$y = -f\tan\alpha - \frac{f(z - z_c)(\tan^2\alpha + 1)}{Y - (z - z_c)\tan\alpha},$$

where z is the height of the object, $z_c$ is the camera height, Y is the distance of the object from the camera, $\alpha$ is the camera tilt angle, and f is the camera focal length. The height of the object image and hence the analysis window height as a function of position in the image can be calculated from the above expression.

(4.2.2) Interest Map

The Interest Map 304 stores information on the "saliency" at each point in the input image. Saliency is defined as a measure of the degree of interest the system should have in various regions of the input image 104. It is well-known that the human visual system does not pay equal attention to all parts of the visual field. Very low level processing occurs to find salient regions which are unusual in some sense with respect to the rest of the visual field. These salient regions can consist of regions with textures, colors, motions, or other low level features that are "different" from the background. Since the saliency features are low-level and local, it is efficient to use them to direct the attention of higher level cognitive recognition processes that use the high resolution but small central field of the human visual system.

Similarly, the Interest Map 304 enables saliency measures to direct the attention of the cognitive swarm. It does this through a modification of the objective function used by the cognitive swarm to modify each particle-agent's velocity at every iteration using the previously described update equations. Previously, the objective function consisted of the object classifier confidence value $F_C$. The new modified objective function is given by:

$$F_A = \mu(Q_+ - Q_-) + (1-\mu)F_C,$$

where $Q_+$ and $Q_-$ are nonnegative quantities describing the level of "positive" (attraction) and "negative" (repulsion) pheromones and $\mu$ is a nonnegative weighting factor.

Pheromones are chemicals secreted by various animals and deposited at physical locations to communicate with other animals by marking paths (attracting pheromones) or territories (repelling pheromones). Here the concept of pheromones are used as a metaphor for providing variable direction of attention for the cognitive swarm. The Interest Map 304 is a map of the net pheromone level $Q_+ - Q_-$ at each spatial location in the input image 104. The dynamic update equation for each swarm particle modifies the particle's velocity according to pbest and gbest values calculated using the new $F_A$ objective function. By varying $\mu$, the relative attraction of high pheromone points can be balanced against the attraction of high classifier confidence values.

The addition of pheromone-based spatially-varying attraction/repulsion is useful for modulating the behavior of the swarm in response to the encountered environment. For example, it can be used to focus the attention of the swarm on high saliency regions, prevent premature convergence on low confidence regions, and modulate the swarm's attention based on user input or object recognition results. It is important to note that while the Interest Map 304 can cause the swarm to focus on image regions with high saliency, the actual classification decision is made using the classifier alone. The pheromone levels are used to modulate the swarm dynamics (e.g., the swarm's spatial focus), but they do not affect the object classification. Positive pheromones generated by saliency cues such as motion or texture are used to attract the swarm towards regions of high motion and texture. However, if a classifier particle determines a position in the image has low classifier confidence, a negative pheromone is deposited at that location to counteract the effects of the positive pheromone and to force the swarm to concentrate on unexplored regions.

Positive pheromones can also be used to concentrate the swarm in certain regions based on operator inputs or the results of other object classifications. As a non-limiting example, it can be used to attract a pedestrian detection swarm to a virtual tripwire in the image in order to quickly detect pedestrians moving across it. Or, if a car-detection swarm finds a car, positive pheromone can be deposited to attract a pedestrian-detection swarm and detect people exiting or entering the car. The spatially-distributed pheromones can be reset every time a new image is acquired, or a decay constant can be used.

In order for the Interest Map 304 to properly modulate the attention of the swarm, a running sorted list must be kept for the global best position (i.e., gbest) and for each particle's best position (i.e., pbest), along with the associated $F_A$ values. As the Interest Map 304 is updated at each iteration of the swarm, $F_A$ is updated for each entry in the list and different previously visited positions may become the current gbest and pbest values for each particle. In this way, the swarm dynamics are modified by the Interest Map 304 in such a way as to focus attention on more salient regions 308. Once particles get close enough to an object for $F_C$ to dominate, then the swarm will converge on that region until the classifier decision conditions are met and the object is recognized or the maximum number of iterations is exceeded.

In other words, the new objective function allows the particles in the swarm to use both the previous classifier response as well as a new difference between the positive and negative pheromone values. A weighted combination of these two values determines the new objective function value. The best particle in the swarm is then the particle with the highest value using the new objective function criteria. The velocity and position update equations remain the same. What actually changes is the particle in the swarm that has the best objective function value. Once the best particle in the swarm in an iteration is ascertained, all particles in the swarm move a random distance towards the best particle. For example, assume that the swarm particles in earlier iterations had deposited a lot of negative pheromone in a certain region of the image and a false alarm is detected in the current frame (i.e., high objective function value using the old objective function criteria). However, the new objective function criteria would diminish the objective function value (since it is combined with the pheromone difference score) and therefore prevent the detection of the false alarm.

(4.2.3) Object Map

The Object Map 306 serves to keep track of whether an object has been detected at each spatial location in the input image 104 by marking a rectangular object region 310 corresponding to the recognized size of the object. The Object Map 306 is useful for preventing unnecessary classifier evaluations for particles that "land" in regions where objects have already been detected. It is also useful for initializing the particle positions where objects have not yet been detected and in regions more likely to contain objects based on previous detection results. By avoiding the object regions 310, all of the particles can be initialized in regions where objects have not yet been detected.

(4.2.4) Local Swarms

Figure 4:
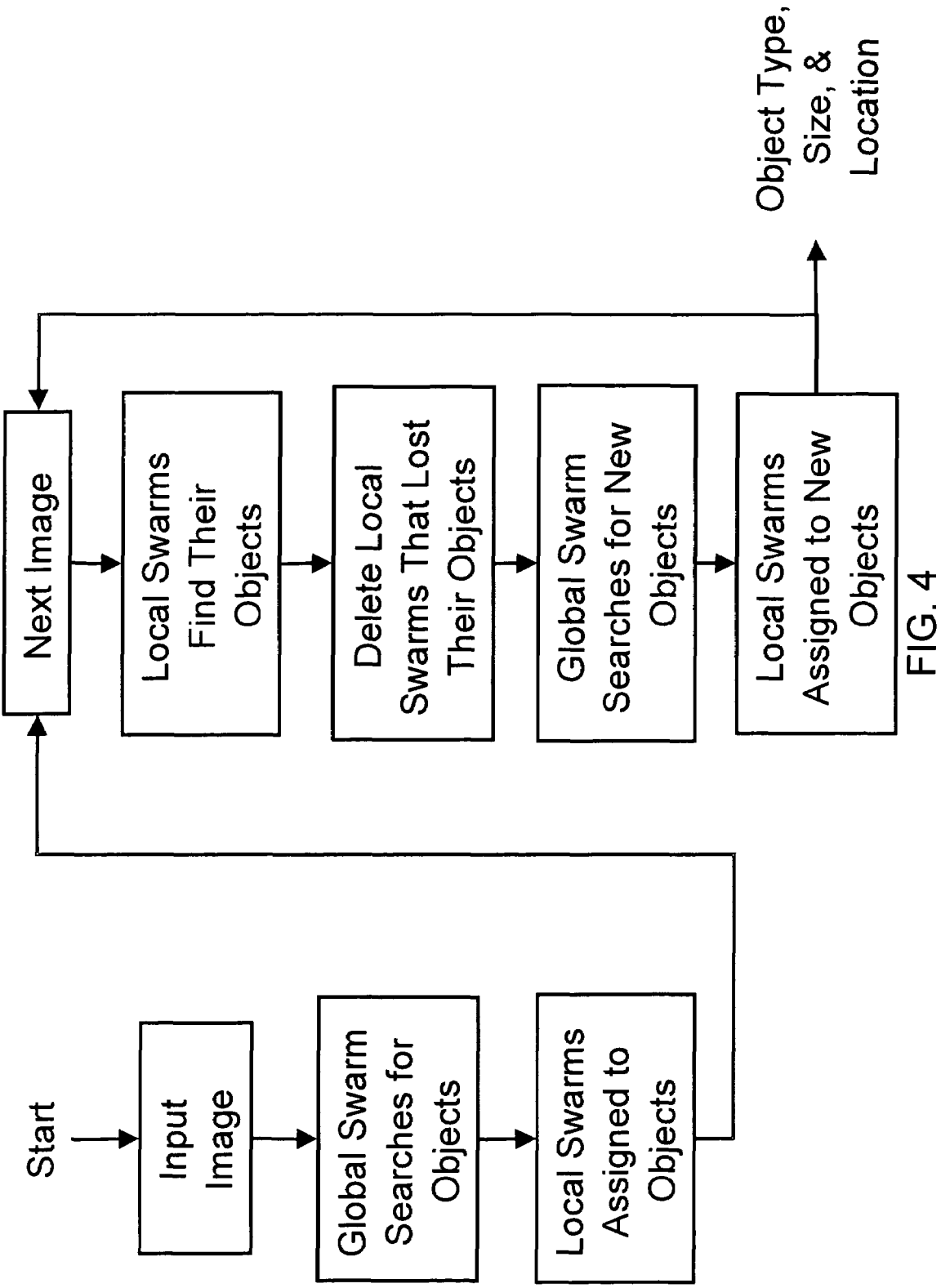
FIG. 4 is a flowchart illustrating multiple object recognition and tracking using global and local cognitive swarms.

A component of the new framework is the use of "local" and "global" swarms working together to recognize and track objects. A global swarm which searches the entire image (but modulated by the cognitive maps) is used to first detect an object which enters the field of view. A local swarm consisting of only a few particles is then initialized in the next image in a small area centered on the previously detected position of the object. The local swarm is used to define restricted areas that global swarms do not search. If the object has not moved substantially, it can be tracked using the local swarm with much fewer classifier evaluations. A tracker, such as a Kalman tracker, can also be used to predict the position of the object in the next image so that the local swarm can be initialized at the predicted position. A flow chart for this process is shown in FIG. 4.

Figure 5:
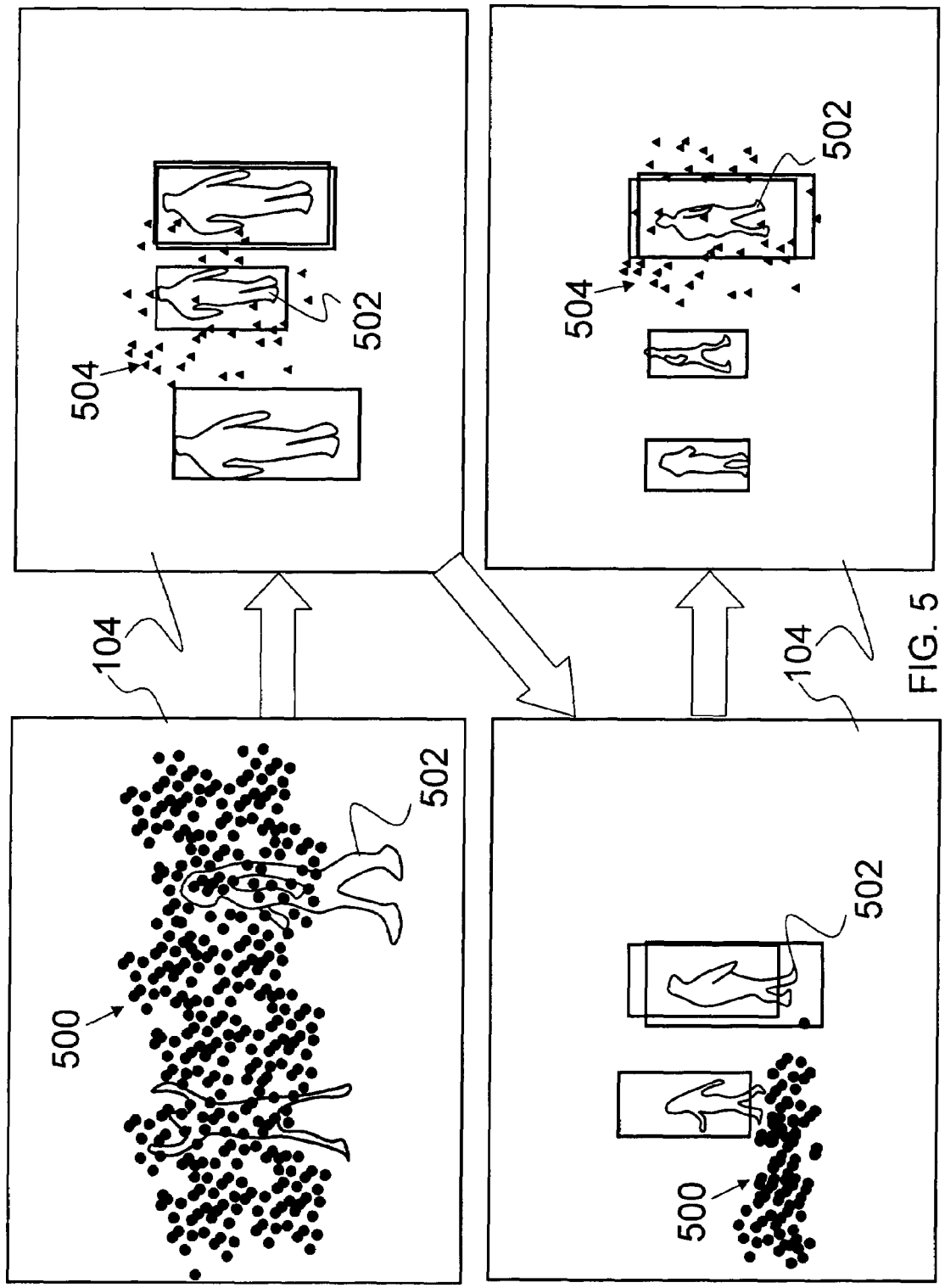
FIG. 5 is an exemplary demonstration of pedestrian recognition and racking using global and local cognitive swarms.

Exemplary experimental results for global swarm acquisition and local swarm recognition and tracking of pedestrians are shown in FIG. 5. First, a global swarm 500 is initialized to search for objects 502 in an input image 104. Next, a local swarm 504 is assigned to the identified objects 502. In another image, the local swarms 504 attempt to find their corresponding assigned objects 502. Local swarms 504 that lost their objects are deleted. The global swarm 500 then searches for new objects 502, with a local swarm 504 thereafter assigned to the new objects 502.

(4.2.5) Analysis Window Diversity

Figure 6:
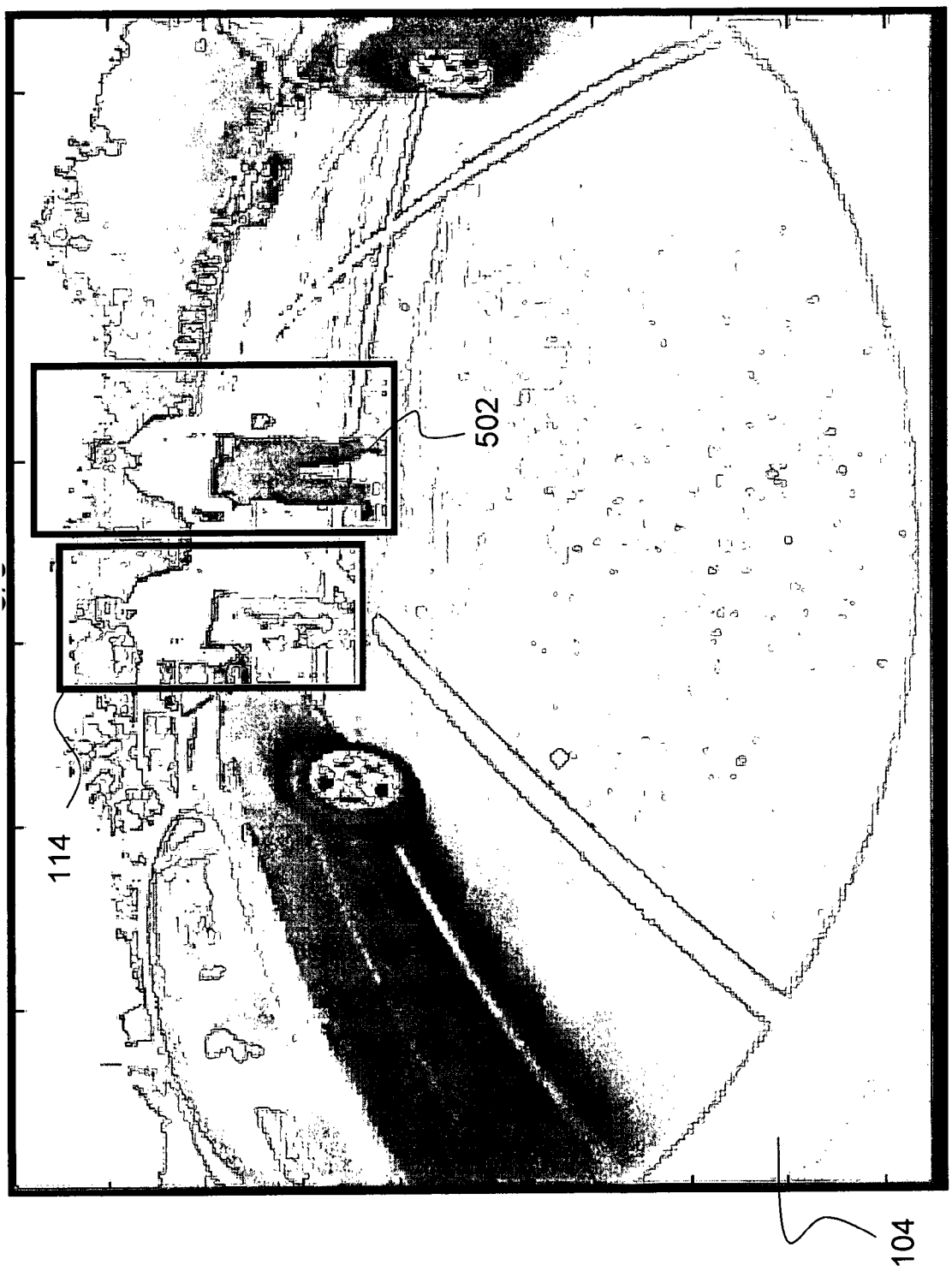
FIG. 6 is an exemplary demonstration of multiple human recognition using an object map, a ground surface map, and window diversity of the attention based cognitive swarm framework according to the present invention.

A true object should be recognized by the classifier even if the analysis window varies in size slightly. In addition, a mirror image of the object should also be recognized. Therefore, the false alarm rate can be improved by performing a mini operation on classifier confidence values obtained for different sizes and mirror images of the analysis window and using the result as the final classifier confidence value. Exemplary experimental results for the attention-based cognitive swarm framework are shown in FIG. 6. As shown in FIG. 6, the analysis window 114 is formed to represent objects 502 in the input image 104.

(4.2.6) Object Recognition System Components

Figure 7:
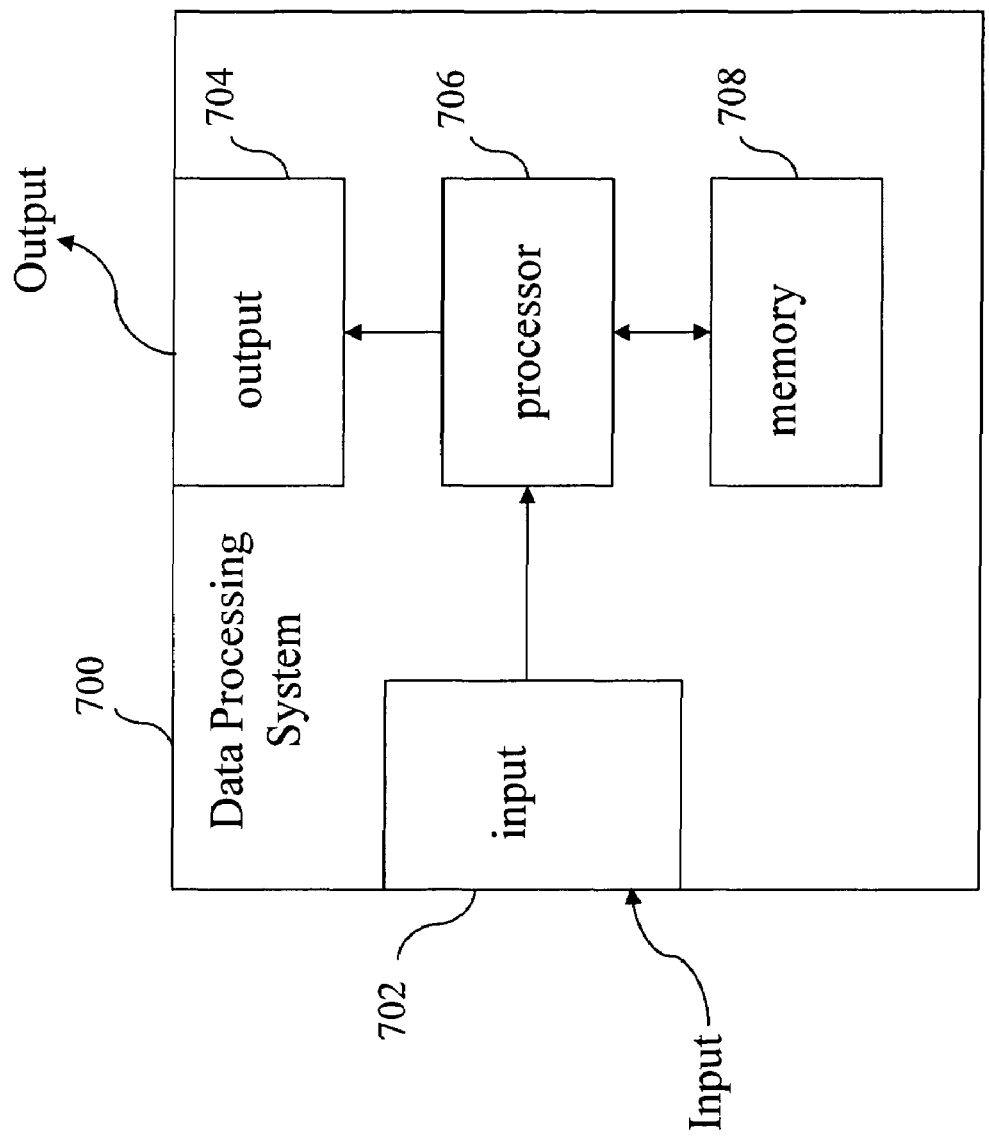
FIG. 7 illustrates a component diagram depicting components of a data process system according to the present invention.

A block diagram depicting the components of object recognition system of the present invention is provided in FIG. 7. The object recognition system 700 comprises an input 702 for receiving an input image. Note that the input 702 may include multiple "ports." Typically, input is received from at least one sensor, non-limiting examples of which include video image sensors. An output 704 is connected with the processor for providing information regarding the presence and/or identity of object(s) in the scene to other systems in order that a network of computer systems may serve as an image processing system. Output may also be provided to other devices or other programs; e.g., to other software modules, for use therein. The input 702 and the output 704 are both coupled with a processor 706, which may be a general-purpose computer processor or a specialized processor designed specifically for use with the present invention. The processor 706 is coupled with a memory 708 to permit storage of data and software to be manipulated by commands to the processor.

(4.2.7) Computer Program Product

Figure 8:
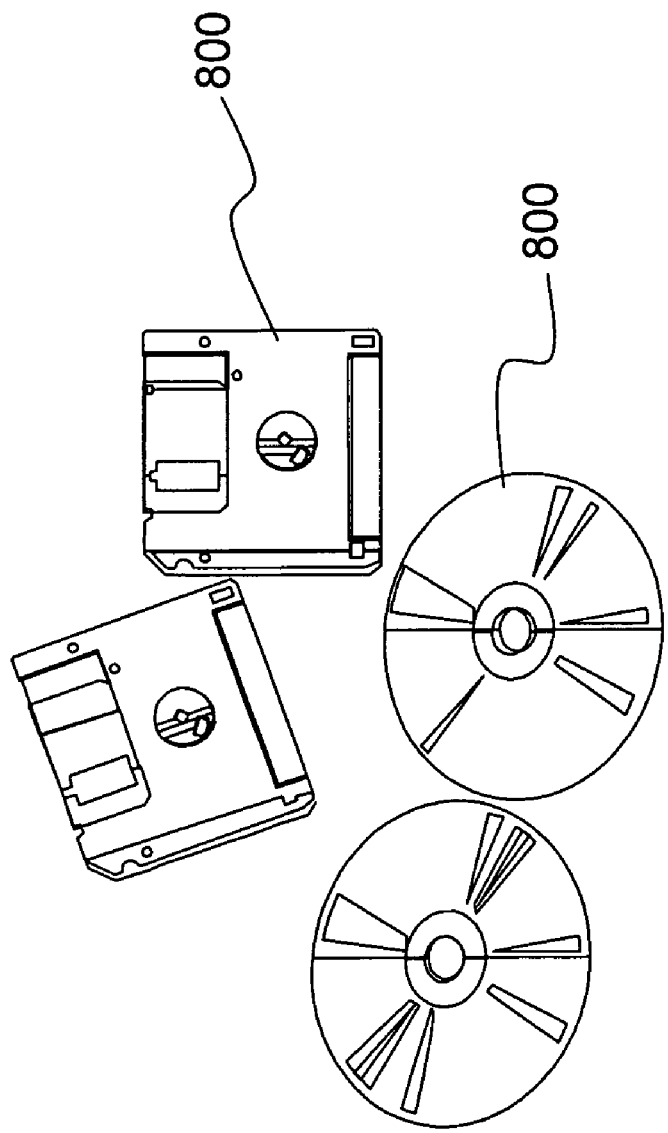
FIG. 8 illustrates a diagram of a computer program product according to the present invention.

An illustrative diagram of a computer program product embodying the present invention is depicted in FIG. 8. The computer program product 800 is depicted as an optical disk such as a CD or DVD. However, as mentioned previously, the computer program product generally represents computer readable code stored on any compatible computer readable medium.

What is claimed is:

1. An object recognition system incorporating swarming domain classifiers, comprising:

at least one cognitive map stored in memory having a one-to-one relationship with an input image domain, the cognitive map being capable of recording information in the memory that software agents utilize to focus a cooperative swarm's attention on regions in the domain most likely to contain objects of interest;

a plurality of software agents executing on a processor configured to operate as a cooperative swarm to classify an object in the domain, where each agent is a complete classifier and is assigned an initial velocity vector to explore a solution space for object solutions, where each agent is configured to perform at least one iteration as influenced by the recorded information of the cognitive map, the iteration being a search in the solution space for a potential solution optima where each agent keeps track of its coordinates in multi-dimensional space that are associated with an observed best solution (pbest) that the agent has identified, and a global best solution (gbest), where the gbest is used to store the best location among all agents, with each velocity vector thereafter changing towards pbest and gbest, allowing the cooperative swarm to concentrate on the vicinity of the object and classify the object when a classification level exceeds a preset threshold;

the cognitive map is a map selected from a group consisting of a ground surface map, an interest map, an object map, and a saliency map; and the interest map stored in the memory is configured to run on the processor and maintain a sorted list for gbest and pbest, along with the associated $F_A$ values, where $F_A$ is an objective function and is calculated according to the following:

$$F_A = \mu(Q_+ - Q_-) + (1-\mu)F_C,$$

where $Q_+$ denotes an attracting pheromone and $Q_-$ denotes a repelling pheromone, and where m is a nonnegative weighting factor, and $F_C$ is an object classifier confidence value; and the interest map is updated in the memory at each iteration of the swarm and $F_A$ is updated for each entry in the sorted list, whereby the swarm is modified by the interest map in such a way as to focus attention on regions of increased saliency.

2. An object recognition system as set forth in claim 1, wherein using the ground surface map, the system is configured to:

store expected object height in pixels at each image location;

constrain an analysis window to an appropriate size at each domain location; and implement space-variant initialization of the cooperative swarm.

3. An object recognition system as set forth in claim 2, wherein using the ground surface map, the system is further configured to calculate a vertical coordinate of y of an imaged object using a pinhole imaging model, the vertical coordinate of y is calculated according to the following:

$$y = -f\tan\alpha - \frac{f(z-z_c)(\tan^2\alpha + 1)}{Y - (z-z_c)\tan\alpha},$$

where z is the height of the object, $z_c$ is the camera height, Y is the distance of the object from the camera, $\alpha$ is the camera tilt angle, and $f$ is the camera focal length.

4. An object recognition system as set forth in claim 3, wherein the interest map is configured to store swarm attracting/repelling pheromones at each domain location, with attracting pheromones having positive values and being stored to attract swarms to high saliency regions and to regions more likely to contain objects based on previous detection results or external inputs, and with repelling pheromones having negative values and being stored to repel swarms away from regions that do not contain objects or which have already been explored, thereby preventing clustering of agents on low confidence regions.

5. An object recognition system as set forth in claim 4, wherein using the object map, the system is configured to perform at least one of the operations of:

storing information at each domain location on previously detected objects;

preventing unnecessary classifier evaluations;

initializing swarms only in regions where objects have not yet been detected;

initializing swarms in regions more likely to contain objects based on previous detection results; and recognizing object groups and behaviors.

6. An object recognition system as set forth in claim 5, wherein the system is further configured to track an object in multiple input images by performing operations of:

receiving a first current input image;

initializing a global swarm to search for objects within the input image;

assigning local swarms to objects identified by the global swarm;

receiving a next input image, where the next input image is deemed the current input image and a previous current input image is deemed the previous input image;

initializing the local swarms to search for and identify objects in the current input image;

deleting local swarms that lost their identified objects between the current and previous input images;

initializing the global swarm to search for new objects in the current input image;

assigning local swarms to new objects identified in the current input image; and repeating the acts of receiving a next input image, initializing, deleting, initializing, and assigning for subsequent next images.

7. An object recognition system as set forth in claim 1, wherein using the ground surface map, the system is further configured to calculate a vertical coordinate of y of an imaged object using a pinhole imaging model, the vertical coordinate of y is calculated according to the following:

$$y = -f\tan\alpha - \frac{f(z-z_c)(\tan^2\alpha + 1)}{Y - (z-z_c)\tan\alpha},$$

where z is the height of the object, $z_c$ is the camera height, Y is the distance of the object from the camera, $\alpha$ is the camera tilt angle, and $f$ is the camera focal length.

8. An object recognition system as set forth in claim 1, wherein the interest map is configured to store swarm attracting/repelling pheromones at each domain location, with attracting pheromones having positive values and being stored to attract swarms to high saliency regions and to regions more likely to contain objects based on previous detection results or external inputs, and with repelling pheromones having negative values and being stored to repel swarms away from regions that do not contain objects or which have already been explored, thereby preventing clustering of agents on low confidence regions.

9. An object recognition system as set forth in claim 1, wherein using the object map, the system is configured to perform at least one of the operations of:
storing information at each domain location on previously detected objects;
preventing unnecessary classifier evaluations;
initializing swarms only in regions where objects have not yet been detected;
initializing swarms in regions more likely to contain objects based on previous detection results; and
recognizing object groups and behaviors.

10. An object recognition system as set forth in claim 1, wherein the system is further configured to track an object in multiple input images by performing operations of:
receiving a first current input image;
initializing a global swarm to search for objects within the input image;
assigning local swarms to objects identified by the global swarm;
receiving a next input image, where the next input image is deemed the current input image and a previous current input image is deemed the previous input image;
initializing the local swarms to search for and identify objects in the current input image;
deleting local swarms that lost their identified objects between the current and previous input images;
initializing the global swarm to search for new objects in the current input image;
assigning local swarms to new objects identified in the current input image; and
repeating the acts of receiving a next input image, initializing, deleting, initializing, and assigning for subsequent next images.

11. A computer program product for object recognition, the computer program product comprising computer-readable instruction means encoded on a computer-readable medium for causing a computer to, when executed, perform the operations of: configuring at least one cognitive map to have a one-to-one relationship with an input image domain, the cognitive map being capable of recording information that software agents utilize to focus a cooperative swarm's attention on regions in the domain most likely to contain objects of interest;
configuring a plurality of software agents to operate as a cooperative swarm to classify an object in the domain, where each agent is a complete classifier and is assigned an initial velocity vector to explore a solution space for object solutions, where each agent is configured to perform at least one iteration as influenced by the recorded information of the cognitive map, the iteration being a search in the solution space for a potential solution optima where each agent keeps track of its coordinates in multi-dimensional space that are associated with an observed best solution (pbest) that the agent has identified, and a global best solution (gbest) where the gbest is used to store the best location among all agents, with each velocity vector thereafter changing towards pbest and gbest, allowing the cooperative swarm to concentrate on the vicinity of the object and classify the object when a classification level exceeds a preset threshold; and further comprising instruction means for causing a computer to:
running and maintaining a sorted list for gbest and pbest, along with the associated $F_A$ values, where $F_A$ is an objective function and is calculated according to the following:

$$F_A = \mu(Q_+ - Q_-) + (1-\mu)F_C,$$

where $Q_+$ denotes an attracting pheromone and $Q_-$ denotes a repelling pheromone, and where m is a nonnegative weighting factor, and $F_C$ is an object classifier confidence value; and updating the cognitive map at each iteration of the swarm and update $F_A$ for each entry in the sorted list, whereby the swarm is modified by the cognitive map in such a way as to focus attention on regions of increased saliency.

12. A computer program product as set forth in claim 11, wherein the cognitive map is a map selected from a group consisting of a ground surface map, an interest map, an object map, and a saliency map.

13. A computer program product as set forth in claim 12, further comprising instruction means for causing a computer to:
store expected object height in pixels at each image location;
constrain an analysis window to an appropriate size at each domain location; and
implement space-variant initialization of the cooperative swarm.

14. A computer program product as set forth in claim 13, further comprising instruction means for causing a computer to calculate a vertical coordinate of y of an imaged object using a pinhole imaging model, the vertical coordinate of y is calculated according to the following:

$$y = -f\tan\alpha - \frac{f(z-z_c)(\tan^2\alpha + 1)}{Y - (z-z_c)\tan\alpha},$$

where z is the height of the object, $z_c$ is the camera height, Y is the distance of the object from the camera, $\alpha$ is the camera tilt angle, and $f$ is the camera focal length.

15. A computer program product as set forth in claim 14, further comprising instruction means for causing a computer to store swarm attracting/repelling pheromones at each domain location, with attracting pheromones having positive values and being stored to attract swarms to high saliency regions and to regions more likely to contain objects based on previous detection results or external inputs, and with repelling pheromones having negative values and being stored to repel swarms away from regions that do not contain objects or which have already been explored, thereby preventing clustering of agents on low confidence regions.

16. A computer program product as set forth in claim 15, further comprising instruction means for causing a computer to perform at least one of the operations of:

storing information at each domain location on previously detected objects;

preventing unnecessary classifier evaluations;

initializing swarms only in regions where objects have not yet been detected;

initializing swarms in regions more likely to contain objects based on previous detection results; and recognizing object groups and behaviors.

17. A computer program product as set forth in claim 16, further comprising instruction means for causing a computer to track an object in multiple input images by performing operations of:

receive a first current input image;

initialize a global swarm to search for objects within the input image;

assign local swarms to objects identified by the global swarm;

receive a next input image, where the next input image is deemed the current input image and a previous current input image is deemed the previous input image;

initialize the local swarms to search for and identify objects in the current input image;

delete local swarms that lost their identified objects between the current and previous input images;

initialize the global swarm to search for new objects in the current input image;

assign local swarms to new objects identified in the current input image; and repeat the operations of receiving a next input image, initializing, deleting, initializing, and assigning for subsequent next images.

18. A computer program product as set forth in claim 11, further comprising instruction means for causing a computer to:

store expected object height in pixels at each image location;

constrain an analysis window to an appropriate size at each domain location; and implement space-variant initialization of the cooperative swarm.

19. A computer program product as set forth in claim 11, further comprising instruction means for causing a computer to calculate a vertical coordinate of y of an imaged object using a pinhole imaging model, the vertical coordinate of y is calculated according to the following:

$$y = -f\tan\alpha - \frac{f(z-z_c)(\tan^2\alpha + 1)}{Y - (z-z_c)\tan\alpha},$$

where z is the height of the object, $z_c$ is the camera height, Y is the distance of the object from the camera, $\alpha$ is the camera tilt angle, and $f$ is the camera focal length.

20. A computer program product as set forth in claim 11, further comprising instruction means for causing a computer to store swarm attracting/repelling pheromones at each domain location, with attracting pheromones having positive values and being stored to attract swarms to high saliency regions and to regions more likely to contain objects based on previous detection results or external inputs, and with repelling pheromones having negative values and being stored to repel swarms away from regions that do not contain objects or which have already been explored, thereby preventing clustering of agents on low confidence regions.

21. A computer program product as set forth in claim 11, further comprising instruction means for causing a computer to perform at least one of the operations of:

storing information at each domain location on previously detected objects;

preventing unnecessary classifier evaluations;

initializing swarms only in regions where objects have not yet been detected;

initializing swarms in regions more likely to contain objects based on previous detection results; and recognizing object groups and behaviors.

22. A computer program product as set forth in claim 11, further comprising instruction means for causing a computer to track an object in multiple input images by performing operations of:

receive a first current input image;

initialize a global swarm to search for objects within the input image;

assign local swarms to objects identified by the global swarm;

receive a next input image, where the next input image is deemed the current input image and a previous current input image is deemed the previous input image;

initialize the local swarms to search for and identify objects in the current input image;

delete local swarms that lost their identified objects between the current and previous input images;

initialize the global swarm to search for new objects in the current input image;

assign local swarms to new objects identified in the current input image; and repeat the operations of receiving a next input image, initializing, deleting, initializing, and assigning for subsequent next images.

23. A computer implemented method for object recognition using swarming domain classifiers, when executed on the computer comprises the acts of:

configuring at least one cognitive map to have a one-to-one relationship with an input image domain, the cognitive map being capable of recording information that software agents utilize to focus a cooperative swarm's attention on regions in the domain most likely to contain objects of interest;

configuring a plurality of software agents to operate as a cooperative swarm to classify an object in the domain, where each agent is a complete classifier and is assigned an initial velocity vector to explore a solution space for object solutions, where each agent is configured to perform at least one iteration as influenced by the recorded information of the cognitive map, the iteration being a search in the solution space for a potential solution optima where each agent keeps track of its coordinates in multi-dimensional space that are associated with an observed best solution (pbest) that the agent has identified, and a global best solution (gbest), where the gbest is used to store the best location among all agents, with each velocity vector thereafter changing towards pbest and gbest, allowing the cooperative swarm to concentrate on the vicinity of the object and classify the object when a classification level exceeds a preset threshold; and running and maintaining a sorted list for gbest and pbest, along with the associated $F_A$ values, where $F_A$ is an objective function and is calculated according to the following:

$$F_A = \mu(Q_+ - Q_-) + (1-\mu)F_C,$$

where $Q_+$ denotes an attracting pheromone and $Q_-$ denotes a repelling pheromone, and where m is a nonnegative weighting factor, and $F_C$ is an object classifier confidence value; and updating the cognitive map at each iteration of the swarm and updating $F_A$ for each entry in the sorted list, whereby the swarm is modified by the cognitive map in such a way as to focus attention on regions of increased saliency.

24. A method as set forth in claim 23, wherein the cognitive map is a map selected from a group consisting of a ground surface map, an interest map, an object map, and a saliency map.

25. A method as set forth in claim 23, further comprising acts of:
storing expected object height in pixels at each image location;
constraining an analysis window to an appropriate size at each domain location; and
implementing space-variant initialization of the cooperative swarm.

26. A method as set forth in claim 23, further comprising an act of calculating a vertical coordinate of y of an imaged object using a pinhole imaging model, the vertical coordinate of y is calculated according to the following:

$$y = -f\tan\alpha - \frac{f(z-z_c)(\tan^2\alpha+1)}{Y-(z-z_c)\tan\alpha},$$

where z is the height of the object, $z_c$ is the camera height, Y is the distance of the object from the camera, $\alpha$ is the camera tilt angle, and $f$ is the camera focal length.

27. A method as set forth in claim 23, further comprising an act of storing swarm attracting/repelling pheromones at each domain location, with attracting pheromones having positive values and being stored to attract swarms to high saliency regions and to regions more likely to contain objects based on previous detection results or external inputs, and with repelling pheromones having negative values and being stored to repel swarms away from regions that do not contain objects or which have already been explored, thereby preventing clustering of agents on low confidence regions.

28. A method as set forth in claim 23, further comprising an act of performing at least one of the operations of:
storing information at each domain location on previously detected objects;
preventing unnecessary classifier evaluations;
initializing swarms only in regions where objects have not yet been detected;
initializing swarms in regions more likely to contain objects based on previous detection results; and
recognizing object groups and behaviors.

29. A method as set forth in claim 23, further comprising an act of tracking an object in multiple input images by performing operations of:
receiving a first current input image;
initializing a global swarm to search for objects within the input image;
assigning local swarms to objects identified by the global swarm;
receiving a next input image, where the next input image is deemed the current input image and a previous current input image is deemed the previous input image;
initializing the local swarms to search for and identify objects in the current input image;
deleting local swarms that lost their identified objects between the current and previous input images;
initializing the global swarm to search for new objects in the current input image;
assigning local swarms to new objects identified in the current input image; and
repeating the acts of receiving a next input image, initializing, deleting, initializing, and assigning for subsequent next images.

30. A computer program product for object recognition, the computer program product comprising computer-readable instruction means encoded on a computer-readable medium for causing a computer to, when executed, perform the operations of:
receiving a first current input image;
initializing a global swarm to search for objects within the input image;
assigning local swarms to objects identified by the global swarm;
receiving a next input image, where the next input image is deemed the current input image and a previous current input image is deemed the previous input image;
initializing the local swarms to search for and identify objects in the current input image;
deleting local swarms that lost their identified objects between the current and previous input images;
initializing the global swarm to search for new objects in the current input image;
assigning local swarms to new objects identified in the current input image; and
repeating the operations of receiving a next input image, initializing, deleting, initializing, and assigning for subsequent next images; and
further camp rising instruction means for causing a computer to:
running and maintaining a sorted list for gbest and pbest, along with the associated $F_A$ values, where $F_A$ is an objective function and is calculated according to the following:

$$F_A = \mu(Q_+ - Q_-) + (1-\mu)F_C,$$

where $Q_+$ denotes an attracting pheromone and $Q_-$ denotes a repelling pheromone, and where m is a nonnegative weighting factor, and $F_C$ is an object classifier confidence value; and
updating a cognitive map at each iteration of the swarm and update $F_A$ for each entry in the sorted list, whereby the swarm is modified by the cognitive map in such a way as to focus attention on regions of increased saliency.

* * * * *